United States Patent [19]

Matsuda et al.

[11] 4,288,903

[45] Sep. 15, 1981

[54] METHOD FOR PRODUCING STUFFING FOR A SPRING-TYPE MATTRESS

[75] Inventors: Tamio Matsuda, Nishio; Sakuichi Tanikawa, Aichi, both of Japan

[73] Assignee: Aisin Seiki Kabushiki Kaisha, Kariya, Japan

[21] Appl. No.: 68,569

[22] Filed: Aug. 22, 1979

[30] Foreign Application Priority Data

Sep. 8, 1978 [JP] Japan ................... 53-110886

[51] Int. Cl.³ .................. B29D 27/04; B23P 17/00
[52] U.S. Cl. .......................... 29/416; 5/481; 29/91.1; 264/46.4; 264/46.5; 264/46.7; 264/157
[58] Field of Search ................ 264/46.5, 46.4, 46.7, 264/157; 5/481; 29/91.1, 416

[56] References Cited

U.S. PATENT DOCUMENTS

| | | | |
|---|---|---|---|
| 3,116,196 | 12/1963 | Terry | 264/46.7 X |
| 3,239,584 | 3/1966 | Terry et al. | 264/46.7 |
| 3,366,026 | 1/1968 | Herr et al. | 264/46.7 X |
| 3,459,611 | 8/1969 | Joseph et al. | 264/46.4 X |
| 3,906,560 | 9/1975 | Bulloch | 264/46.7 X |
| 3,942,926 | 3/1976 | Bulloch | 264/46.4 X |

Primary Examiner—Philip Anderson
Attorney, Agent, or Firm—Oblon, Fisher, Spivak, McClelland & Maier

[57] ABSTRACT

A method for producing stuffing for a spring-type mattress, including the steps of forming grooves on the whole circumference of edge portions of upper and lower mold members, fixing dense and sparse seats on flat surfaces of the upper and lower mold members, respectively, bending whole edge portions of both seats into the grooves, inserting and fixing elastic plates into the grooves, pouring a certain predetermined quantity of an undiluted solution of foaming plastics onto the flat surface of the lower mold member and tight contacting both mold member before forming the undiluted solution, horizontally and symmetrically cutting and dividing the stuffing into two parts, turning over the two parts and assembling them so as to cover a spring assembly thereonto thereby covering the two parts by an outer decorative member as a mattress unit.

4 Claims, 5 Drawing Figures

METHOD FOR PRODUCING STUFFING FOR A SPRING-TYPE MATTRESS

BACKGROUND OF THE INVENTION

1. Field of the Invention

This invention relates to a method for producing a stuffing for a spring-type mattress, and particularly to a method for producing stuffing for a spring-type mattress through foaming and moulding plastics.

2. Description of the Prior Art

It is known to provide a method for producing stuffing for a spring-type mattress so that each face of the stuffing is separately moulded. As a result it is difficult to produce a mattress of this type in mass production, that is, it is difficult to obtain thin and wide objects and also difficult to obtain desirable effects of moulding for the separate moulding of each face of the stuffing.

It is also known to provide a method for producing a stuffing for a spring-type mattress like that of a seat which receives a spring mattress and is in contact therewith, is integrated with the stuffing by means of a set pin, etc. Thus, wrinkle and looseness of the seat are liable to occur and formation of ridges in the foaming portion of the seat will often occur and the moulded member will be damaged upon removing this member from the moulding. By the formation of ridges in the seat, the hardness of the stuffing will be reduced due to scattering and also the durability of the stuffing will be lowered. Hardness of each webbing edge of the stuffing which is to be hardened as a mattress is therefore lacking and this results in deformations in the mattress and bending of the mattress.

SUMMARY OF THE INVENTION

The main object of this invention is to provide a method for producing stuffing for a spring-type mattress through foaming and moulding plastics which obviates the above-mentioned drawbacks of conventional processes.

It is another object of the invention to provide a method for producing stuffing for a spring-type mattress through foaming and moulding plastics which can produce a stuffing having a sufficient thickness.

Still another object of the invention is to provide a method for producing stuffing for a spring-type mattress through foaming and moulding plastics which can obtain good moulding, long durability and uniform cushion for the mattress.

A further object of the invention is to provide a method for producing stuffing for a spring-type mattress through foaming and moulding plastics which is well ventilated.

An additional object of the invention is to provide a method for producing stuffing for a spring-type mattress through foaming and moulding plastics which is new in concept and highly simplified.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
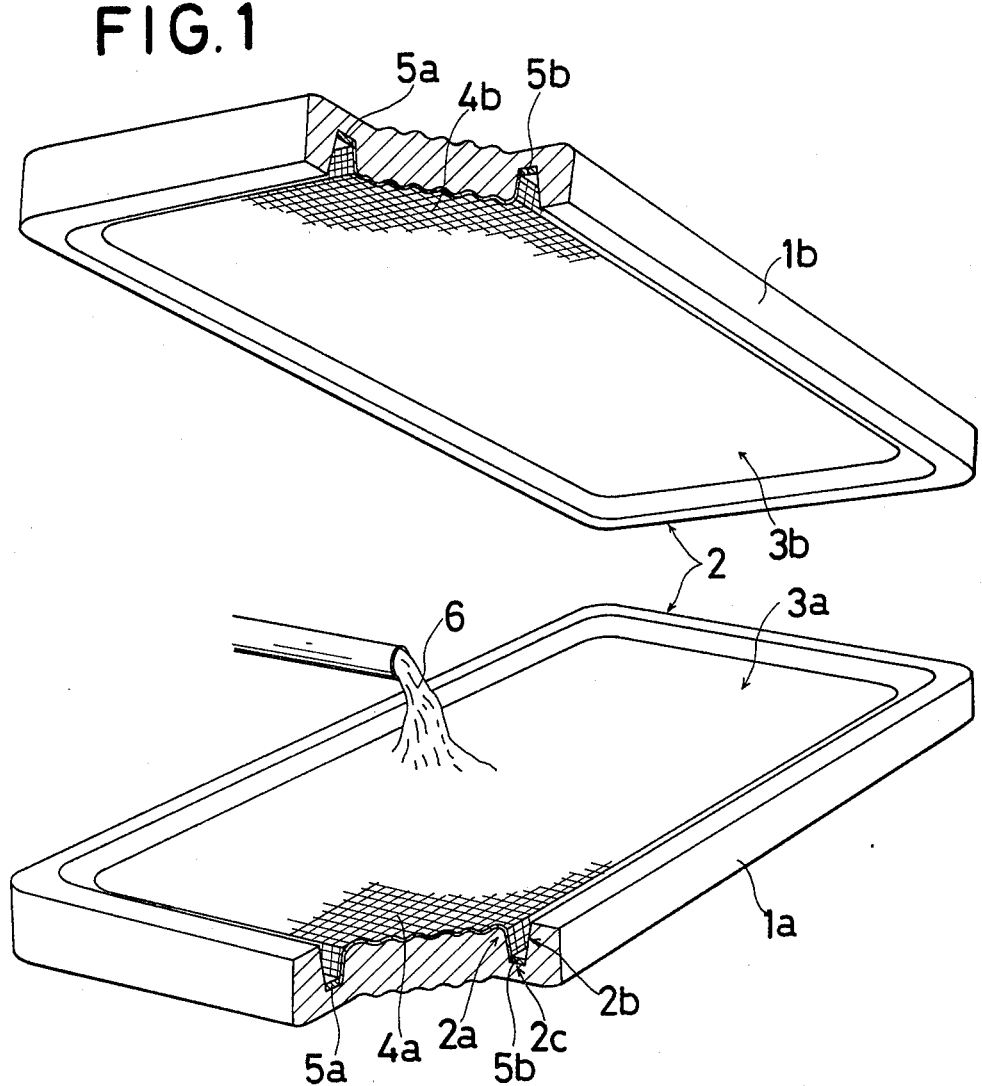
FIG. 1 shows the injecting state of an undiluted solution after seats are attached to upper and lower mold members by an elastic plate.

Referring now to the drawings and especially to FIG. 1 thereof, it will be noted that seats 4a, 4b are stretched within the mold and a certain quantity of an undiluted solution 6 of plastics is injected or poured into such mold.

Reference numerals 1a and 1b indicate lower and upper mold members and such are provided with a groove 2 having a slope such that webbing is formed on the whole circumference of the edge portion of the stuffing. Seat 4a made of a dense spring-like member and is fitted on a flat surface 3a of the lower mold member 1a and the quadrilateral shape of the seat 4a is bent to be fitted to correspond to the inside or surface portion 2a of the groove 2. Elastic plates 5a, 5b which have almost the same length as the bottom portion 2c of the groove 2 and have a slightly larger width compared with groove 2 are inserted and fixed within the inside 2a of the groove 2 along inner and outer side portions 2a, 2b of the groove 2. The elastic plates 5a, 5b are made of a polyethylene foaming material etc. having a comparatively hard elasticity. The elastic plates 5a, 5b serve to prevent the seat 4a from wrinkling and becoming loose and also reinforce the seat 4a.

A polypropylene cloth etc. having a dense texture is used for the seat 4a for it is necessary to finish the foaming before the undiluted solution leaks between the mold surface and the seat 4a upon applying the undiluted solution within the groove 2. It should be noted that the elastic plates 5a, 5b are fixedly attached within the bottom portion 2c of the groove 2.

Seat 4b is made of a comparatively sparse (i.e. less dense) spring-like material and is fitted on a flat surface 3b of the upper mold member 1b and a quadrilateral portion of the seat 4b is bent into the groove in a manner similar to that of seat 4a of the lower mold member 1a. Elastic plates 5a, 5b which have the same characteristics as the elastic plates 5a, 5b in the lower mold member 1a are inserted and fixed within the groove 2.

A gauze etc. material having a sparse or less dense spring-like characteristic is used for the seat 4b since the undiluted solution 6 or liquid is at first in a foaming state when applied to the flat surface 3 of the lower mold member 1a and is not sunk into the upper mold member 1b.

Figure 2:
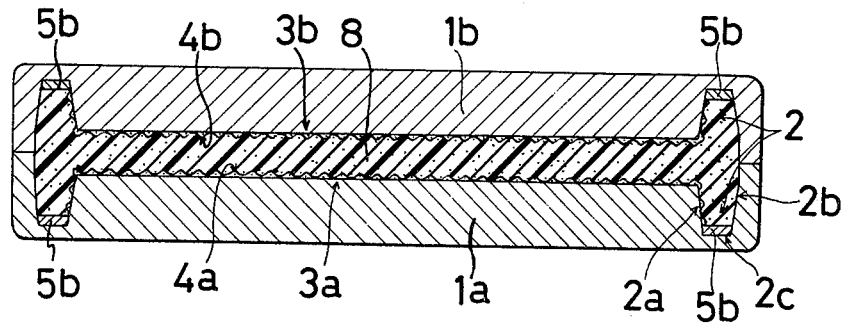
FIG. 2 shows a sectional view taken along line II—II of FIG. 3 of a mold, however, showing a state wherein the undiluted solution is foamed.

After the preparation of the solution or liquid and the pouring process is completed, the upper and lower mold members 1b, 1a are tightly secured together and the foaming process is then started as shown in FIG. 2. The foaming operation of the forming process occurs within seven or eight minutes after tightening together of the mold members 1a, 1b and following this operation, the adhesive force among the elastic plates 5a, 5b, seats 4a, 4b and a foamed member 8 of the undiluted solution 6 is strengthened and such form an integral member.

When the completed stuffing 7 is taken out of the mouldings 1a, 1b, the seats 4a, 4b and the elastic plates 5a, 5b of the stuffing 7 are integrally formed due to the adhesive force of the foamed member 8 itself.

Figure 3:
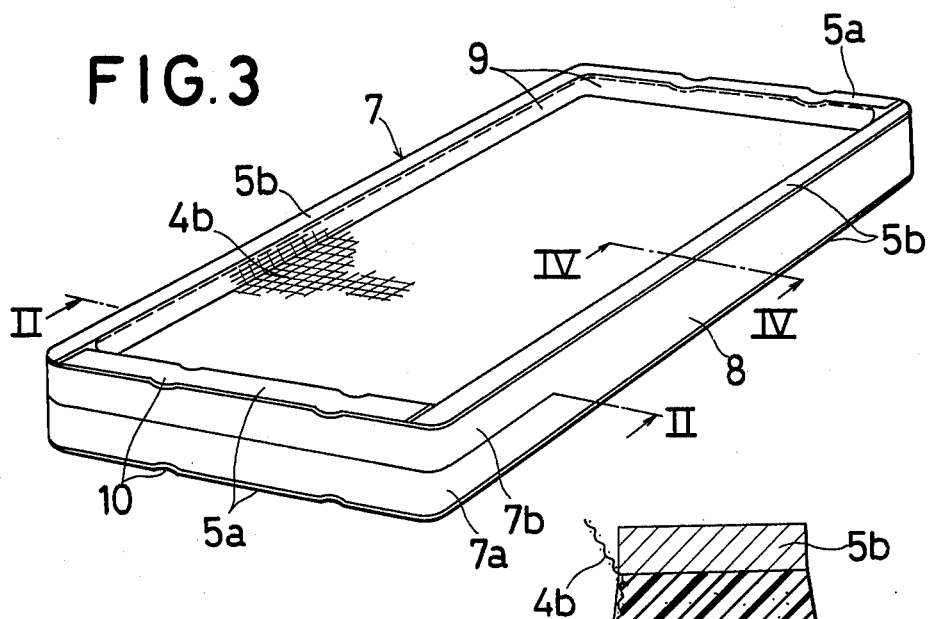
FIG. 3 shows a similar view to FIG. 1, however, showing stuffing which is removed from the mold after formation.
Figure 5:
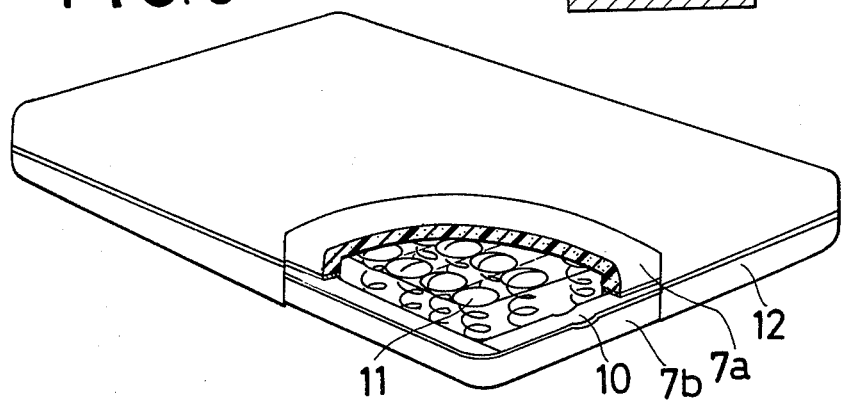
FIG. 5 shows a similar view to FIG. 1, however, showing a mattress utilizing stuffing according to the present invention.

FIG. 3 illustrates a concave portion 10 of a webbing 9 which is formed by a convex portion (not shown) which is located at the bottom portion 2c of the groove 2 of each mold members 1a, 1b. The concave portion 10 serves to ventilate the inside of a mattress assembly as shown in FIG. 5.

Figure 4:
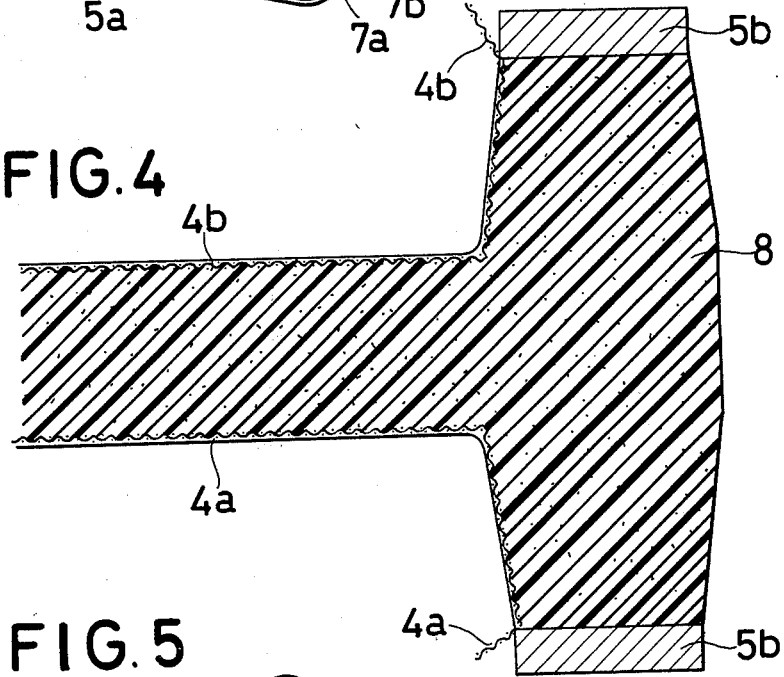
FIG. 4 shows a similar view to FIG. 2, however, taken along the line IV—IV of FIG. 3.

The foamed member 8, the seats 4a, 4b and the elastic plate 5b(5a) of stuffing 7 are more clearly shown in FIG. 4 and the seats 4a, 4b are integrally formed with foamed member 8 except the portions wherein the seats 4a, 4b are fixedly attached with both mold members 1a, 1b and the elastic plates 5a, 5b. In case that an elastic plate 5b(5a) is removed from the mold members 1a, 1b, the slope of the concave portion is modified due to the elasticity of the elastic plate 5b (5a).

The stuffing 7 is symmetrically cut along the line IV—IV in FIG. 3 and is divided into a part 7a having a comparatively hard cushioning characteristic and a part 7b having a comparatively soft cushioning characteristic. The manufacturing process of the stuffing 7 is thus completed wherein the part 7a of the stuffing 7 has a comparatively hard cushioning characteristic for a seat 4a made of a dense spring-like material and the part 7b of the stuffing has a comparatively soft cushioning characteristic for a seat 4b made of a sparse (less dense) spring-like material as abovementioned. The two parts 7a, 7b of the stuffing 7 are then turned over and assembled to form a spring assembly 11, respectively, and are finally covered by an outer decorative member 12 as a mattress assembly which is shown in FIG. 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing stuffing to form a spring-type mattress assembly including at least one spring member utilizing upper and lower mold members, which comprises:
    forming grooves along the entire circumferential edge portions of said upper and lower mold member;
    fixing a dense seat member on a flat surface of said lower mold member and a relatively less dense seat member on a flat surface of said upper mold member;
    bending edge portions of each of said seat members into said grooves of said upper and lower mold members;
    inserting and fixing elastic plates within said grooves of said upper and lower mold members;
    pouring a predetermined quantity of an undiluted solution of plastics to be foamed onto said flat surface of said lower mold;
    tightly contacting said upper and lower mold members together for therein expanding and forming said undiluted solution of plastics into a resulting mass, thereby forming a stuffing member integrally composed of said resulting mass, each of said seat members and said plates;
    horizontally and symmetrically cutting and dividing said stuffing member into a first part and a second comparatively hard part;
    turning said first and second parts of said stuffing member over and assembling them so as to engage respective elastic plates of said first and second parts and cover said at least one spring; and
    covering said two parts of said stuffing member by an outer decorative member to form said mattress assembly.

2. A method for producing a stuffing for a spring-type mattress assembly as set forth in claim 1, which further comprises:
    forming sloped portions on said grooves of said upper and lower mold member.

3. A method for producing a stuffing for a spring-type mattress as set forth in claim 2, which further comprises:
    forming said elastic plates so as to have substantially the same length and slightly larger widths than bottom portions of said grooves.

4. A method for producing a stuffing for a spring-type mattress as set forth in claim 3, which further comprises:
    forming concave portions along edge portions of said stuffing member by providing corresponding convex portions on bottom portions of said grooves of said upper and lower mold members prior to pouring said undiluted solution of plastics.

* * * * *